United States Patent [19]

Hager

[11] Patent Number: 4,532,821

[45] Date of Patent: Aug. 6, 1985

[54] TRANSMISSION FOR RACING CARS

[76] Inventor: Thomas A. Hager, 410 Third St., W. Easton, Pa. 18042

[21] Appl. No.: 544,252

[22] Filed: Oct. 21, 1983

[51] Int. Cl.$^3$ ............................................. F16H 3/08
[52] U.S. Cl. ....................................... 74/370; 74/372
[58] Field of Search ................ 74/373, 372, 370, 369; 192/20

[56] References Cited

U.S. PATENT DOCUMENTS

| | | | |
|---|---|---|---|
| 942,912 | 12/1909 | Keller | 74/372 |
| 1,003,315 | 9/1911 | Baerbalck et al. | 74/372 |
| 2,379,021 | 6/1945 | Marchak | 74/333 |
| 4,343,612 | 8/1982 | Blanchard | 74/372 X |
| 4,373,409 | 2/1983 | Beyedek et al. | 74/339 X |

FOREIGN PATENT DOCUMENTS

| | | | |
|---|---|---|---|
| 68158 | 3/1915 | Fed. Rep. of Germany | 74/373 |
| 323181 | 7/1920 | Fed. Rep. of Germany | 74/333 |
| 896461 | 7/1949 | Fed. Rep. of Germany | 74/373 |
| 1817405 | 7/1970 | Fed. Rep. of Germany | 74/373 |
| 905833 | 12/1945 | France | 74/333 |
| 371945 | 1/1939 | Italy | 74/333 |

Primary Examiner—George H. Krizmanich
Assistant Examiner—Dirk Wright
Attorney, Agent, or Firm—Ruth Moyerman

[57] ABSTRACT

A modified manual synchronized automobile transmission for use in racing cars eliminates second gear and imparts initial rotary motion from the engine to the output shaft via a by-pass of gearing including a normally disengaged clutch. Brief engagement of the clutch causes power to feed through this by-pass gear train for just so long as the clutch is engaged and, depending on the setting of interlocked collar selector forks, will cause reverse motion of forward motion in low gear. When the car is in racing modality and moving forward in low gear, it is then possible, without further reference to the clutch, to place the main gear train in direct drive, linking the main drive shaft of the motor and the output shaft of the transmission to achieve "lock up". The invention obviates the need for a flywheel. The invention may be practiced by physical modification of an existing manual synchronized transmission.

13 Claims, 5 Drawing Figures

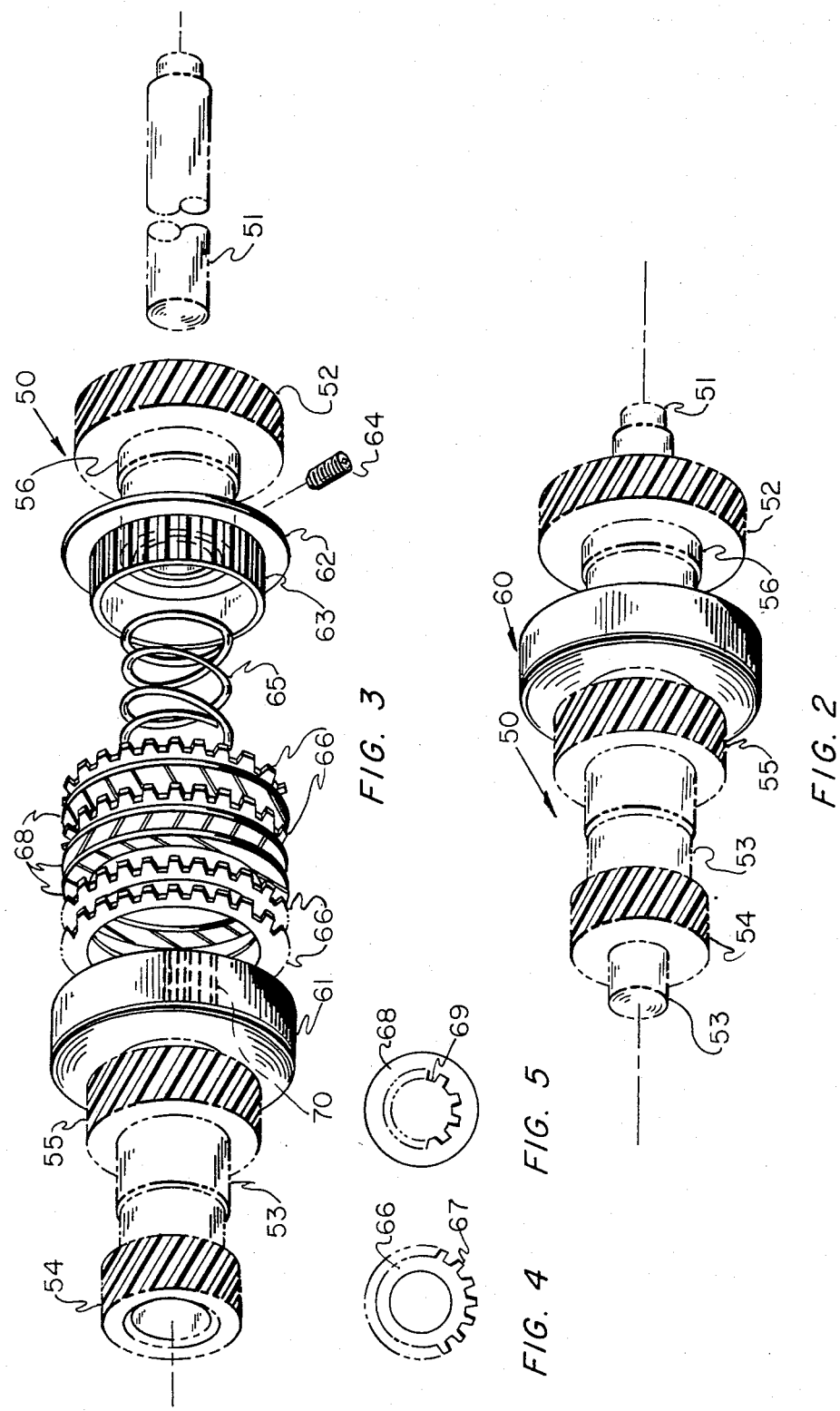

TRANSMISSION FOR RACING CARS

BACKGROUND OF THE INVENTION

1. Field of the Invention

This invention relates to motor vehicles and more particularly to modified manual synchronized transmissions having special utility in connection with certain classes of racing cars.

2. Description of the Prior Art

Motor vehicles all require transmission systems and there are a wide range of such systems ranging from manual through fully automatic. However, racing cars present particular problems vis-a-vis transmissions due to "class" requirements imposed by various associations which set up rules and guidelines for such cars. For example, in certain classes, there is a requirement that the car be able to move forward and in reverse under its own power, unassisted by handlers or pit crew. In other classes this requirement applies only to forward motion and there is no requirement for a reverse gear.

This performance specification or requirement can, of course, be met by a wide variety of transmissions. However, in order to do so, there must be present gearing which has no utility other than meeting the specification since, once a racing car is in motion, it may best be driven in a fully locked-up configuration where there is, in effect, a direct coupling of engine output to transmission drive shaft. Consequently, conventional methods of meeting the requirement involve heavy transmissions and the utilization of a conventional flywheel. These mechanisms, once the car is moving, represent extra baggage which, deleteriously, effects racing performance.

Commonly used transmissions for modification in accordance with the invention are those known as fully synchronized 3-speed manual transmissions. These may be, for example, of the Chevrolet type (e.g. Muncie) or of the Ford type. While such transmissions are generally similar, there are minor differences involving first and reverse gearing. But all of them involve the selective sliding longitudinal displacement of a sleeve or collar from one gear engaging position to another with, in the case of low gear (i.e. first) and reverse, an intermediate disengaged position. As used henceforth herein, synchronizer is intended to mean such a prior art mechanism and collar is intended to mean that portion thereof which is moved by the forks to cause selective predetermined gear engagement. The collar itself, as in the case of the reverse and first gear collar of the Ford transmission, may be part of a gear train.

A general understanding of the operation of such synchromesh transmissions can be obtained by reference to pages 104 and 105 of "The Bosch Book of the Motor Car" by John Day et al, St. Martin's Press, Inc., NYC (copyright 1975 by Robert Bosch Ltd.).

As used herein, the term modification or the term modified manual transmission is utilized in two senses. In one sense, an actual physical modification of an existing transmission is contemplated. In the other sense, a modification of the design of an existing type of transmission is contemplated. In the first case, there are certain constraints deriving from the need for utilizing as many of the original components as possible. These constraints do not apply in the second case where all components, including housing, can be fabricated ab initio to suit the modified design. Both concepts are intended to be embodied herein since they differ only in the amount of investment one is willing to make in tooling and changes in components which are unrelated to the gravamen of the invention.

I am not aware of prior art solutions to the racing car class requirements discussed above. In retrospect, it has been discovered that there are some mechanisms in the tractor art which permit the vehicles to "Creep" forward or in reverse. One such mechanism is shown in U.S. Pat. No. 4,373,409. However, a separate creeper gear mechanism is utilized which is positioned upstream of the transmission and is independent of it. Further, there is no teaching of modifications within the transmission itself which, by their utilization, would enable a racing car to meet performance specifications.

SUMMARY OF THE INVENTION

The aforementioned prior art problems are overcome by the transmission for racing cars of this invention.

Briefly summarized, the invention comprises a modified manual synchronized automobile transmission of the type which has an output shaft on which are mounted a plurality of forward gears and a reverse gear and about which shaft are coaxially mounted a plurality of synchronizers selected from the types referred to above. These synchronizers may include collars which are adapted to be longitudinally shifted by gear selector forks to selectively engage a particular gear. The collars themselves may be part of a gear train.

The invention includes an output shaft, a main drive shaft, a stub shaft, a counter shaft and interlocked selector forks, as well as a friction clutch and means for temporarily engaging the clutch, which is normally biased in disengaged position.

The output shaft has mounted on or about it a reverse gear, a low gear, a first synchronizer (the collar of which is adapted for displacement from a neutral position to either a low-gear activating position or a reverse-gear activating position) and a second synchronizer (the collar of which is adapted for displacement from a disengaged position to a direct drive position). There are also a plurality of mechanically interlocked selector forks which control movement of said collars into predetermined activating positions.

The main drive shaft is rotatably mounted in coaxial alignment with the output shaft. One end of it is operatively linked to an automobile engine and the other end is proximate that end of the output shaft on which the second synchronizer is mounted. The main drive shaft has mounted on it a main drive counter-gear which is operatively connected to the output shaft only when the second synchronizer collar is in its engaged position. The nature of synchronizers is such that this shift cannot be achieved until the output shaft is rotating at a speed sufficient to permit the shift. Such a shift constitutes the "lock up" position for the transmission.

The function of the stub shaft, counter shaft and friction clutch are to constitute a by-pass for torque and cause initial motion of the output shaft and initial movement of the motor vehicle in the desired direction. Once this has been achieved and (in the case of forward motion) the second synchronizer engaged, their function ceases.

This by-pass function is achieved by providing a stub shaft which is located on an axis parallel to the common axis of the output shaft and the main drive shaft. On this stub shaft is mounted a main drive counter gear which is in constant driven engagement with the main drive gear. On the same axis as the stub shaft there is provided a counter shaft on which there is mounted a reverse gear which is in meshing contact with the reverse gear on the output shaft. There is also a low gear drive mounted on the counter shaft which is in meshing contact with the low gear on the output shaft. Between the stub shaft and the counter shaft there is provided a friction clutch which, when engaged, permits rotational linking of the two shafts. It is normally biased in the disengaged position. Means are also provided for temporarily engaging the clutch.

Consequently, when the clutch is disengaged, there is no motion of the vehicle. This is just the opposite of normal clutch operation where depressing of a clutch pedal causes motion to cease.

When the clutch is engaged, the counter shaft turns for the first time and permits engagement, via selection of the proper collar, of either low gear or reverse gear. This meets class requirements and permits unassisted forward or reverse motion of the vehicle. Where forward racing motion is desired and the car is moving slowly forward, it is now possible, via shifting of the second synchronizer collar, to directly link the main drive shaft and output shaft to achieve "lock up" of the transmission.

Analysis of the foregoing operation will indicate that there has been a solution of the prior art problems discussed above. The transmission is literally responsive to performance specifications for various classes of race cars. It is light in weight because of the elimination of all gears but a low gear and a reverse gear. Furthermore, the nature of the transmission obviates the need for a heavy flywheel.

Conceptually, the invention may be alternatively briefly summarized with respect to modification—in the physical sense—of existing manual transmissions. In such a modification, the original countershaft is cut into a stub shaft and an abbreviated counter shaft between which there is inserted a friction clutch. There is also modification of the output shaft by removal of at least one forward gear—which creates room in the housing for the friction clutch. One may remove more than one forward gear but at least one must remain. The gear drives for these gears may, if desired, be removed from the abbreviated counter shaft. Additionally, when no reverse action is required, reverse gear may be removed from the output shaft and the reverse gear drive from the counter shaft. The by-pass action remains as discussed above with the friction clutch, normally biased in disengaged position, being utilized to link the drive shaft (via the main drive gear and main drive counter gear) to the counter shaft and thence, via the meshing gears to the output shaft. Once the output shaft is turning (in a forward direction) there can be an immediate shift into direct drive. The clutch and counter shaft have thus served their purpose. In such modification, the total length of abbreviated counter shaft plus clutch plus stub shaft approximates the original counter shaft length so that housing and other components can continue to be utilized and cost of modification minimized.

Accordingly, it is an object of this invention to provide a modified manual synchronized transmission which enables a vehicle to be self-propelled in reverse gear, or alternatively move forward in low gear, and immediately thereafter go into direct drive without need for additional gearing.

It is a further object of this invention to provide a transmission for a racing car which is light in weight, meets class requirements for self-propulsion, and permits elimination of the utilization of conventional flywheels as kinetic energy reservoirs.

Still another object of this invention is to provide a transmission of the type described which is easy to operate, readily repaired, low in cost and relatively foolproof in operation.

An additional object of this invention is to provide a transmission which eliminates the need for a conventional clutch, thereby eliminating excessive weight from the racing vehicle.

It is still a further object of this invention to locate a clutch mechanism proximate the lay, or counter, shaft in place of the second gear drive, and to thus enable elimination of second gear from the output shaft.

It is yet another object of this invention to enable the stock car racer to accelerate quickly out of track turns as the centrifugal force of the flywheel has been eliminated and the nose of the race car stays closer to the track surface.

These and other objects of the invention will be apparent to those skilled in the art from a consideration of the accompanying drawings and detailed description of an exemplary embodiment.

BRIEF DESCRIPTION OF THE DRAWING(S)

In the drawings, wherein like reference numerals designate like parts:

FIG. 2 represents an enlarged isometric detail of a clutch and shaft assembly shown in FIG. 1.

FIG. 3 represents an exploded isometric view of the assembly shown in FIG. 2.

FIG. 4 is an elevation showing a pressure plate as utilized in the clutch of FIG. 3.

FIG. 5 is an elevation showing a clutch plate as utilized in the clutch of FIG. 3.

DETAILED DESCRIPTION OF THE PREFERRED EMBODIMENT

Figure 1:
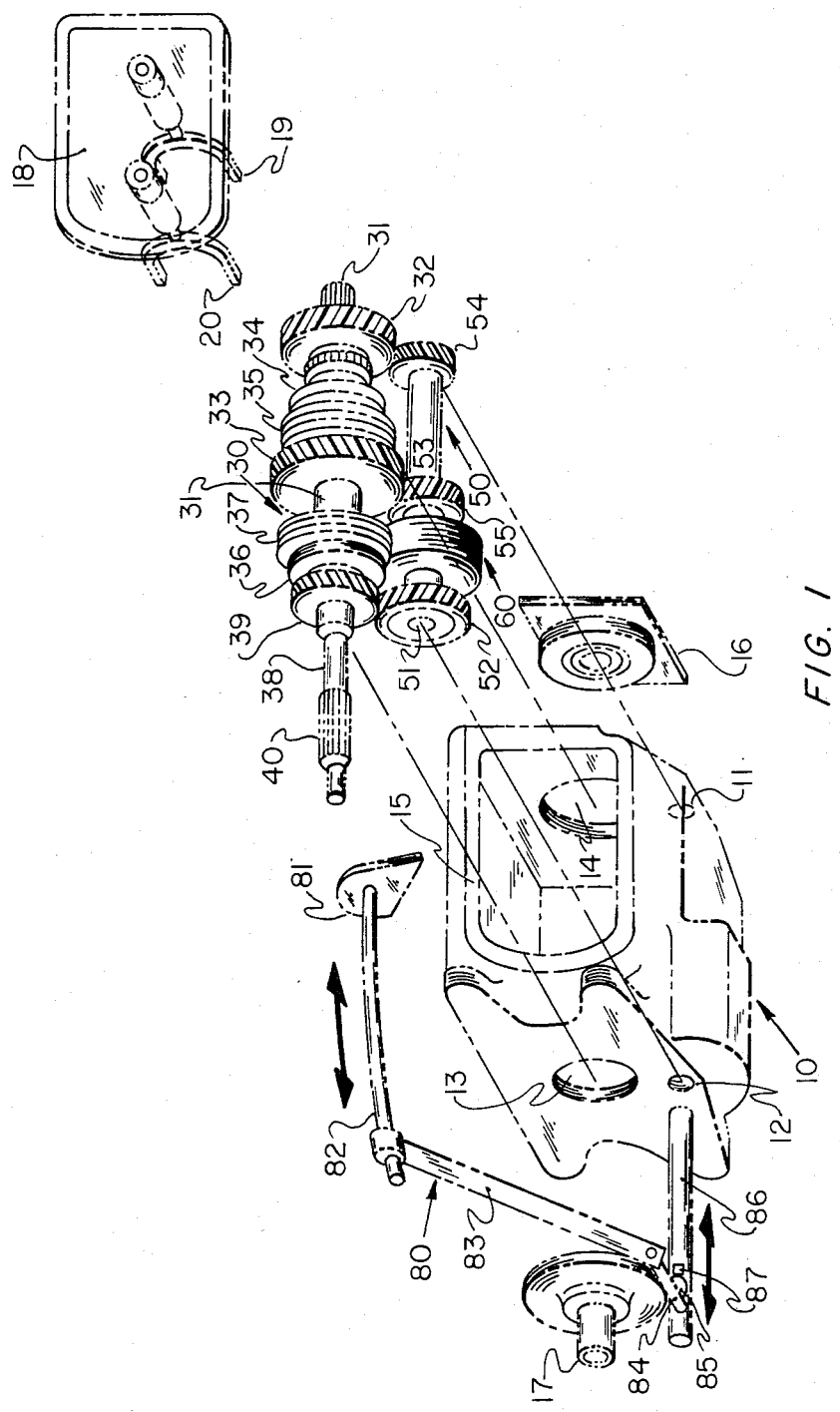
FIG. 1 represents a partially diagramatic exploded isometric view of a Muncie fully synchronized 3-speed transmission embodying the invention.

As shown in FIG. 1, the transmission, which in this case is of the Chevrolet type, is enclosed in a casing—generally 10—which includes a plurality of journal openings 11, 12, 13 and 14 as well as an access opening 15. Journal bearing assembly 16 is mounted on opening 14 and sleeve assembly 17 is mounted on opening 13. Gaskets, bolts and other conventional construction details are not shown.

A cover plate 18, which is suitably gasketed, is mounted over opening 15. Removal of the cover plate gives access to the internal parts of the transmission.

On the plate 18 are pivotally mounted a first selector fork 19 and a second selector fork 20. As is customary in the art, these selector forks are mechanically interlocked so that, for example, it is impossible to go into direct drive while the vehicle is in reverse gear. The hand operated lever system for positioning the forks is not shown, being no part of the instant invention. The interlocking permits movement of synchronizer collars into only predetermined activating positions.

The housing 10 is filled with suitable lubricating fluid. The various gaskets, machined surfaces and the like necessary for fluid-tight construction are conventional and will not, therefore, be discussed.

Consideration should now be given to a gear and shaft assembly, generally 30, which is shown in FIG. 1.

The assembly includes an output shaft 31, on one end of which is mounted a reverse-gear 32. Spaced apart from gear 32 is coaxially mounted a low-gear 33. Intermediate these two gears is mounted a first synchronizer 34, which includes a collar 35. The collar 35 is moved, by fork 19, in a reciprocal longitudinal manner from a neutral position to either a low-gear activating position or a reverse-gear activating position. A second synchronizer 36, which includes a collar 37, is co-axially mounted about the other end of shaft 31.

Collar 37 is moved by fork 20 between a disengaged and a direct drive position. Interlocking of the forks prevents movement of collar 37 into its direct drive position when collar 35 is in its reverse-gear position.

A main drive shaft 38 is rotatably mounted in coaxial alignment with output shaft 31. One end of the shaft 38 is operatively linked to an automobile engine utilizing, for example, a splined section 40 and the other end of the shaft which is proximate the end of output shaft 31 upon which second synchronizer 36 is mounted, has mounted upon it main drive gear 39. Shaft 38 rotates as long as the engine is operative but the motion of this shaft is not transmitted to output shaft 31 unless and until second synchronizer collar 37 is in its direct drive position.

Consideration should now be given to the clutch and shaft assembly, generally 50, which is shown inter alia in FIG. 2. This assembly includes a stub shaft 51 having a distal end upon which is mounted main drive countergear 52, utilizing a sleeve 56. As shown in FIG. 1, this gear meshes with main drive gear 39 and rotates with it.

Also part of the assembly is a counter shaft, sometimes referred to as a lay shaft 53 which is coaxially aligned with stub shaft 51 but separated from it. A reverse gear drive 54, which meshes with reverse gear 32 (see FIG. 1), is mounted on the distal end of shaft 53. A low gear drive 55, which meshes with low gear 33, is also mounted on a shaft 53, intermediate its distal and proximal ends. In between the lay shaft 53 and stub shaft 51 there is mounted a friction clutch, generally 60, details of which are shown in FIGS. 3, 4 and 5.

Clutch 60 includes a clutch drum 61 which is mounted on counter shaft 53 proximate low gear drive 55. This drum is provided with internal teeth 70. Rotation of this portion of the clutch rotates shaft 53. The clutch further includes a clutch drive cap 62, including an integral, externally toothed sleeve 63, which is mounted on stub shaft 51 as with set screw 64. Shaft 51 has some slight possibility for longitudinal play (on the order of 1/16th inch) due to the use of sleeves such as 56 for mounting components thereon. The outside diameter of cap 62 is less than the inside diameter of drum 61 and, consequently, the plate is capable of longitudinal motion with respect to the drum.

Within the housing defined by the space between drum 61 and cap 62 are provided a biasing coil spring 65 which is compressed between these components and serves to keep them resiliently spaced-apart. Also located within the void and mounted concentrically about the spring are a plurality of annular pressure plates 66 having external circumferential teeth 67. Plates 66 are shown in FIG. 4. These plates are interspersed with a plurality of annular clutch plates 68 which are provided with internal circumferential teeth 69. These plates are shown in FIG. 5. Teeth 69 engage the toothed sleeve 63 and, consequently, plates 68 turn along with drive cap 62.

Teeth 67 engage internal threads 70 and, consequently, plates 66 turn with drum 61. Thus, there exists within the clutch, a group of plates 68 which turn with cap 62 and another interspersed group of plates 66 which turn with drum 61. However, no torque is transmitted through the clutch from shaft 51 to shaft 43 until the bias is overcome and plates 66 and 68 come together in face-to-face frictional juxtaposition. Plates 66 and 68 may vary in number depending on the application and various patterns of interspersal may be used including alternating of each type.

Returning to FIG. 1, consideration should be given to clutch engaging assembly, generally 80, which has as its ultimate purpose, the movement of stub shaft 51 to overcome the spring bias within the clutch 60. The particular assembly shown which is merely representative of a host of alternates includes a pedal 81 affixed to a pedal extension rod 82. The end of the rod remote from the pedal is adjustably held in a boss at one end of a pitman 83, the other end of which is attached to, and rotates, a cam actuator rod 84. The rod abuts activating shaft 86 and integral with the rod is a cam 85 which contacts a cam follower 87 affixed to the side of shaft 86. Not shown are the various brackets which would attach these members to portions of a motor vehicle body.

It can be seen that movement of the rod 82 in the reciprocating directions indicated by the arrow produces similar motion of shaft 86. That is, pressing down on pedal 81 causes shaft 86 to move against shaft 51 and spring bias to be overcome within the clutch until the pedal is released.

Details of assembly are apparent from FIG. 1. Clutch and shaft assembly 50 is mounted within housing 10, utilizing journal apertures 11 and 12 and appropriate bearings. Assembly 30 is also mounted within the housing, utilizing bearing assembly 16 to permit shaft 31 to extend somewhat beyond the housing and utilizing sleeve assembly 17 to support shaft 38. Within the housing, the gears mesh essentially as shown in the Figure. Cover plate 18 is mounted with the forks 19 and 20 in contact with their respective collars. The housing is then filled with oil and is ready to operate once the assembly 80 is present with activating shaft 86 contacting the end of stub shaft 51.

Operation is generally as follows. When it is desired to move the vehicle in reverse, fork 19 is reciprocated into its reverse position. As long as it is in this position, the interlocks prevent engagement of fork 20. Then, with the engine running, pedal 81 is depressed. This causes the clutch to engage and reverse gear drive 54 to rotate, transmitting power to reverse gear 32. Reverse motion will continue only so long as the pedal is depressed. As soon as it is released, motion stops.

When it is desired to move the vehicle forward in low gear, fork 19 is reciprocated into its low position. Again, the interlocks come into play and will now permit serial movement of fork 20, if desired. However, initially, forward motion in low gear is obtained by depressing the clutch pedal, whereby low gear drive 55 rotates and transmits power to low gear 33. The car now moves forward in low gear. If the driver is racing, then he is able to continue by moving fork 20 into the direct drive position.

It will be apparent to those skilled in the art that numerous changes and modifications may be made within the scope of the invention. Consequently, it is not to be construed as limited to the details of the specific embodiment which has been described above. Rather, it is to be limited only by a reasonable interpretation of the appended Claims.

What is claimed is:

1. In a modified manual synchronized transmission having a transmission drive shaft adapted to be operatively coupled to an engine, the improvement comprising:
   (a) an output shaft on which is mounted at least one forward gear and which, as modified, contains at least one forward gear fewer than originally provided in an unmodified transmission of the same type;
   (b) an abbreviated counter shaft, the axis of which is parallel to the axis of said output shaft;
   (c) a stub shaft in co-axial alignment with said counter shaft, the adjacent ends of said counter shaft and said stub shaft being spaced apart;
   (d) gear means for driving the stub shaft from the transmission drive shaft;
   (e) a friction clutch mounted intermediate said stub shaft and said counter shaft, said clutch linking the adjacent ends of said two shafts to permit rotational linking thereof when said clutch is engaged, said clutch being normally biased in disengaged position—the total length of said abbreviated counter shaft, said stub shaft and said friction clutch approximating the length of the counter shaft provided in an unmodified transmission of the same type;
   (f) at least one forward gear drive mounted on said abbreviated counter shaft which drive is the meshing companion of the forward gear on said output shaft;
   (g) means for engaging said clutch by overcoming its normal bias;
   (h) first synchronizer means for selectively rotationally linking said counter shaft and said output shaft via said forward gear and its companion forward gear drive, said means also including a neutral position;
   (i) second synchronizer means for selectively rotationally linking the transmission drive shaft to said output shaft in direct drive, said means also including a disengaged position; and,
   (j) a plurality of mechanically interlocked selector forks which control movement of said first and said second synchronizer means and permit selection of only predetermined gear orientations;

said modified transmission permitting a vehicle in which it is installed to move slowly forward when said first synchronizer means is in its forward position and said means for engaging said clutch is operated and, once forward motion has been established, permitting the direct linking of the transmission drive shaft and said output shaft to allow the vehicle to be driven forward at full speed.

2. The transmission according to claim 1 which further includes a reverse gear mounted on said output shaft, a reverse gear drive mounted on said abbreviated counter shaft—which drive is the meshing companion of said reverse gear on said output shaft; said first synchronizer means also having a position for selectively rotationally linking said counter shaft and said output shaft via said reverse gear and its companion drive, whereby a vehicle in which said transmission is installed can also move slowly backward when said first synchronizer means is in its reverse position and said means for engaging said clutch is operated, said interlocked selector forks preventing engagement of said second synchronizer means when said first synchronizer means is in reverse.

3. The transmission according to claim 1 wherein said friction clutch (e) further comprises:
   (k) a clutch drum mounted on one of the adjacent ends of either said abbreviated counter shaft or said stub shaft;
   (l) a clutch drive cap mounted on the other one of the adjacent ends of either said abbreviated counter shaft or said stub shaft;
   (m) a plurality of annular plates of a first type within the space between said cap and said drum which turn with said drum;
   (n) a plurality of annular plates of a second type within the space between said cap and said drum which turn with said cap, said two types of plates being interspersed; and,
   (o) resilient means for biasing said cap and said drum in spaced apart relationship to prevent face-to-face frictional juxtaposition of said plates, the bias created by said resilient operation of engaging means (g).

4. The transmission according to claim 3 wherein said first type plates and said second type plates are alternated one with the other.

5. The transmission according to claim 2 wherein said friction clutch (e) further comprises:
   (k) a clutch drum mounted on one of the adjacent ends of either said abbreviated counter shaft or said stub shaft;
   (l) a clutch drive cap mounted on the other one of the adjacent ends of either said abbreviated counter shaft or said stub shaft;
   (m) a plurality of annular plates of a first type within the space between said cap and said drum which turn with said drum;
   (n) a plurality of annular plates of a second type within the space between said cap and said drum which turn with said cap, said two types of plates being interspersed;
   (o) resilient means for biasing said cap and said drum in spaced apart relationship to prevent face-to-face frictional juxtaposition of said plates, the bias created by said resilient operation of engaging means (g).

6. The transmission according to claim 5 wherein said first type plates and said second type plates are alternated one with the other.

7. A modified manual 3-speed synchronized transmission, containing no second gear, comprising:
   (a) a transmission drive shaft, one end of which is adapted to be operatively linked to an internal combustion engine;
   (b) a main drive gear mounted proximate the other end of said drive shaft;
   (c) a stub shaft, the axis of which is parallel to the axis of said drive shaft;
   (d) a main drive counter gear mounted on one end of said stub shaft in continuous meshing engagement with said main drive gear;
   (e) a counter shaft mounted in coaxial alignment with said stub shaft;
   (f) a low gear drive mounted on said counter shaft;
   (g) a reverse gear drive mounted on said counter shaft;

(h) an output shaft in coaxial alignment with said drive shaft;
(i) a low gear mounted on said output shaft, adapted to mesh with said low gear drive;
(j) a reverse gear mounted on said output shaft, adapted to mesh with said reverse gear drive;
(k) a friction clutch mounted intermediate said stub shaft and said counter shaft, said clutch spanning the two shafts and permitting rotational linking thereof only when it is engaged, said clutch being normally biased in disengaged position;
(l) first synchronizer means for said low gear and said reverse gear, positionable by a selector fork to predetermined neutral, low and reverse orientations;
(m) second synchronizer means linking said main drive shaft and said output shaft, positionable by a selector fork to predetermined disengaged and direct drive orientation;
(n) a plurality of mechanically interlocked selector forks which control movement of said synchronizer means and permit selection of a predetermined orientation;
(o) means for temporarily engaging said friction clutch to transmit torque to said output shaft via said counter shaft and, depending on the orientation of said first synchronizer, causing forward or rearward motion of the automobile and, thereafter, in the case of forward motion, permitting use of said second synchronizer means to achieve direct drive of said output shaft said modified transmission obviating the need for a flywheel.

8. A modified manual syncronized vehicle transmission of a type which has an output shaft on which are mounted a plurality of forward gears and a reverse gear and about which shaft are coaxially mounted a plurality of synchronizers, including collars, which are adapted to be longitudinally shifted by gear selector forks, to selectively engage a particular one of said gears, comprising:
(a) an output shaft;
  (i) a reverse-gear mounted on one end of said shaft;
  (ii) at least one forward gear mounted about said shaft and spaced apart from said reverse-gear;
  (iii) a first synchronizer, including a collar, coaxially mounted about said shaft, adjacent said reverse gear, said collar being adapted for reciprocal longitudinal displacement from a neutral position to either a forward-gear activating position or a reverse-gear activating position;
  (iv) a second synchronizer, including a collar, coaxially mounted about the other end of said output shaft, said collar being adapted for reciprocal longitudinal displacement into a direct drive position;
(b) a plurality of mechanically interlocked selector forks which control movement of said collars into predetermined positions; and,
(c) a main drive shaft, rotatably mounted in coaxial alignment with said output shaft, one end of which is operatively linked to an engine and the other end of which is proximate the end of said output shaft where said second synchronizer is mounted;
  (i) a main drive gear, mounted on said drive shaft and adapted to be operatively connected to said output shaft only when said second synchronizer collar is in its direct drive position;
(d) a stub shaft, having a proximal end and a distal end, the axis of which is parallel to the common axis of said output shaft and said main drive shaft;
  (i) a main drive counter-gear mounted on the distal end of said stub shaft which is in constant driven engagement with said main drive gear;
(e) a counter shaft having a proximal end and a distal end, which is coaxially aligned with said stub shaft but separated therefrom;
  (i) a reverse gear drive mounted on the distal end of said counter shaft in meshing contact with the reverse gear on said output shaft;
  (ii) a forward gear drive mounted on said counter shaft, intermediate its distal end and its proximal end, in meshing contact with said forward gear on said output shaft;
(f) a friction clutch mounted intermediate said stub shaft and said counter shaft, said clutch spanning from the proximal end of said counter shaft to the proximal end of said stub shaft and permitting rotational linking of the two shafts only when it is engaged, said clutch being normally biased in disengaged position; and,
(g) means for temporarily engaging said clutch to transmit torque to said output shaft via said counter shaft and, depending on the setting of said first synchronizer collar, permitting forward or rearward motion of the automobile and, thereafter, in the case of forward motion, permitting use of said second synchronizer collar to directly link said main drive shaft and said output shaft, whereby, the need for an additional forward gear and a flywheel is obviated.

9. A transmission according to claim 8 wherein said clutch (f) further comprises:
(h) a clutch drum mounted on the proximal end of either said counter shaft or said stub shaft;
(i) a clutch drive cap mounted on the proximal end of the other of said shafts;
(j) a plurality of annular plates of a first type within the space between said cap and said drum which turn with said drum;
(k) a plurality of annular plates of a second type within the space between said cap and said drum which turn with said cap, said two types of plates being interspersed;
(l) resilient means for biasing said cap and said drum in spaced apart relationship to prevent face-to-face frictional juxtaposition of said plates;

overcoming said bias causing said plates to come into frictional juxtaposition and thereby rotationally linking said counter shaft and said stub shaft for so long as said bias is overcome.

10. The transmission according to claim 9 wherein said first type plates and said second plates ae alternated one with the other.

11. The transmission according to claim 9 wherein, further, said cap has a shoulder containing external teeth and the plates of said first type have internal circumferential teeth which mesh with the teeth of said shoulder, said plates being clutch plates and where said drum has internal teeth and the plates of said second type are pressure plates which have external teeth which engage the teeth on said drum.

12. The transmission according to claim 11 wherein said clutch plates and said pressure plates are alternated one with the other.

13. The transmission according to claim 8 wherein said means for temporarily engaging said clutch comprises a lever system including a foot pedal and an activating shaft which abuts the distal end of said stub shaft, pressure on said foot pedal causing said activating shaft to move said stub shaft longitudinally and thereby temporarily overcome the normal bias of said friction clutch.

* * * * *